(12) United States Patent
King (10) Patent No.: US 9,080,448 B2
(45) Date of Patent: Jul. 14, 2015

(54) GAS TURBINE ENGINE VANES

(75) Inventor: Brian Paul King, Greenwood, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 621 days.

(21) Appl. No.: 12/978,971

(22) Filed: Dec. 27, 2010

(65) Prior Publication Data

US 2011/0286847 A1 Nov. 24, 2011

Related U.S. Application Data

(60) Provisional application No. 61/290,843, filed on Dec. 29, 2009.

(51) Int. Cl.
| | | |
|---|---|---|
| *F01D 9/04* | (2006.01) | |
| *F01D 9/06* | (2006.01) | |

(52) U.S. Cl.
CPC ............... *F01D 9/041* (2013.01); *F01D 9/042* (2013.01); *F01D 9/065* (2013.01); *F05D 2260/30* (2013.01); *Y02T 50/672* (2013.01); *Y02T 50/673* (2013.01)

(58) Field of Classification Search
CPC .......... F01D 9/041; F01D 9/042; F01D 9/065
USPC ......... 415/142, 189–190, 209.2–209.4, 210.1
See application file for complete search history.

(56) References Cited

U.S. PATENT DOCUMENTS

| | | | |
|---|---|---|---|
| 2,843,355 A | 7/1958 | Findley | |
| 2,855,179 A | 10/1958 | Brown | |
| 3,572,969 A | 3/1971 | McLimore | |
| 3,679,324 A | 7/1972 | Stargardter | |
| 3,756,746 A | 9/1973 | Baker | |
| 3,762,835 A | 10/1973 | Carlson et al. | |
| 4,314,791 A * | 2/1982 | Weiler ........................ | 415/115 |
| 4,973,521 A | 11/1990 | Graff et al. | |
| 5,076,049 A * | 12/1991 | Von Benken et al. .......... | 60/797 |
| 5,493,855 A | 2/1996 | Walters et al. | |
| 5,630,700 A * | 5/1997 | Olsen et al. ................... | 415/134 |
| 6,464,456 B2 * | 10/2002 | Darolia et al. ................ | 415/134 |
| 6,514,046 B1 * | 2/2003 | Morrison et al. ......... | 416/229 A |
| 6,658,715 B1 | 12/2003 | Podesta | |
| 7,118,322 B2 * | 10/2006 | Mortgat ........................ | 415/12 |
| 7,300,256 B2 * | 11/2007 | Masserey et al. ............ | 416/230 |
| 7,326,030 B2 * | 2/2008 | Albrecht et al. ............. | 415/115 |
| 7,452,189 B2 * | 11/2008 | Shi et al. ...................... | 416/226 |
| 8,206,098 B2 * | 6/2012 | Prill et al. .................... | 415/200 |
| 2001/0045094 A1 | 11/2001 | Wilbraham | |
| 2004/0042902 A1 | 3/2004 | Hornick et al. | |

(Continued)

OTHER PUBLICATIONS

International Search Report and Written Opinion, PCT/US2010/062378, Nov. 25, 2011, Rolls-Royce North American Technologies Inc.

*Primary Examiner* — Nathaniel Wiehe
*Assistant Examiner* — Brian O Peters
(74) *Attorney, Agent, or Firm* — Krieg DeVault LLP (57) ABSTRACT

One embodiment of the present invention is a gas turbine engine. Another embodiment is a gas turbine engine vane system. Other embodiments include apparatuses, systems, devices, hardware, methods, and combinations for gas turbine engine vanes. Further embodiments, forms, features, aspects, benefits, and advantages of the present application shall become apparent from the description and figures provided herewith.

20 Claims, 5 Drawing Sheets

(56) References Cited

U.S. PATENT DOCUMENTS

| | | |
|---|---|---|
| 2004/0158984 A1 | 8/2004 | Lundgren |
| 2005/0076504 A1 | 4/2005 | Morrison et al. |
| 2006/0045747 A1 | 3/2006 | Martin et al. |
| 2006/0171812 A1* | 8/2006 | Albrecht et al. ............. 416/190 |
| 2007/0154307 A1* | 7/2007 | Cairo ........................ 415/209.3 |

* cited by examiner

GAS TURBINE ENGINE VANES

CROSS REFERENCE TO RELATED APPLICATIONS

The present application claims the benefit of U.S. Provisional Patent Application 61/290,843, filed Dec. 29, 2009, and is incorporated herein by reference.

FIELD OF THE INVENTION

The present invention relates to gas turbine engines, and more particularly, to gas turbine engine vanes.

BACKGROUND

Gas turbine engine vanes remain an area of interest. Some existing systems have various shortcomings, drawbacks, and disadvantages relative to certain applications. Accordingly, there remains a need for further contributions in this area of technology.

SUMMARY

One embodiment of the present invention is a gas turbine engine. Another embodiment is a gas turbine engine vane system. Other embodiments include apparatuses, systems, devices, hardware, methods, and combinations for gas turbine engine vanes. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figure 1:
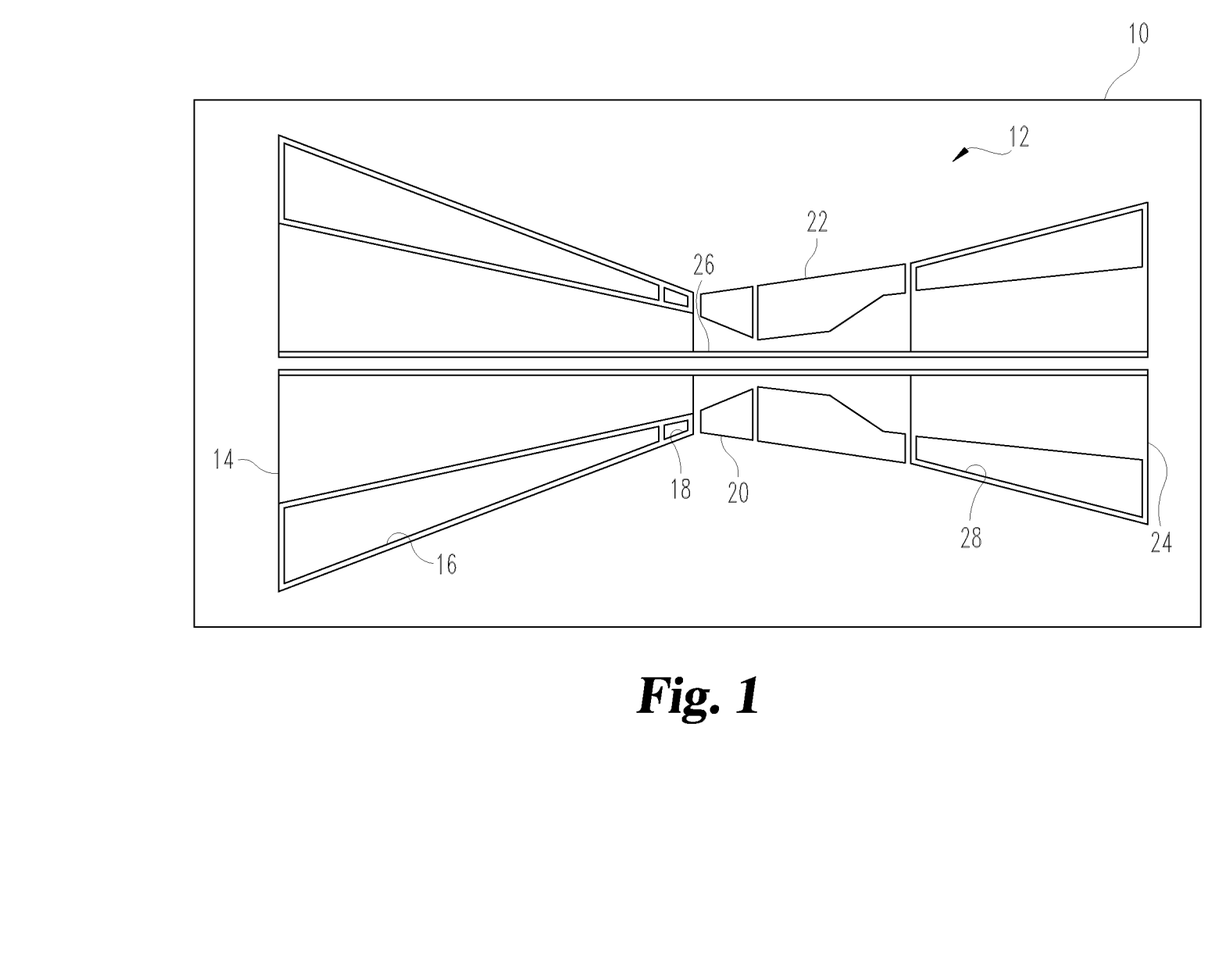
FIG. 1 schematically depicts a non-limiting example of a gas turbine engine in accordance with an embodiment of the present invention.

Referring now to the drawings, and in particular, FIG. 1, a non-limiting example of a gas turbine engine 10 in accordance with an embodiment of the present invention is schematically depicted. In one form, gas turbine engine 10 is an axial flow machine, e.g., an aircraft propulsion power plant. In other embodiments, gas turbine engine 10 may be a centrifugal flow machine or a combination axial centrifugal flow machine. It will be understood that the present invention is equally applicable to various gas turbine engine configurations, for example, including turbojet engines, turbofan engines, turboprop engines, and turboshaft engines having axial, centrifugal and/or axi-centrifugal compressors and/or turbines.

In the illustrated embodiment, gas turbine engine 10 includes an engine core 12. Engine core 12 includes a compressor 14 having a plurality of blades and vanes 16, and outlet guide vanes (OGV) 18, a diffuser 20, a combustor 22 and a turbine 24. Diffuser 20 and combustor 22 are fluidly disposed between OGV 18 of compressor 14 and turbine 24. Turbine 24 is drivingly coupled to compressor 14 via a shaft 26. Although only a single spool is depicted, embodiments of the present invention are equally applicable to multi-spool engines. In various embodiments, gas turbine engine 10 may include, in addition to engine core 12, one or more fans, additional compressors and/or additional turbines.

During the operation of gas turbine engine 10, air is supplied to the inlet of compressor 14. Blades and vanes 16 compress air received at the inlet of compressor 14, and after having been compressed, the air is discharged via OGV 18 into diffuser 20. Diffuser 20 reduces the velocity of the pressurized air from compressor 14, and directs the pressurized air to combustor 22. Fuel is mixed with the air and combusted in combustor 22, and the hot gases exiting combustor 22 are directed into turbine 24.

Turbine 24 includes a plurality of blades and vanes 28. Blades and vanes 28 extract energy from the hot gases to generate mechanical shaft power to drive compressor 14 via shaft 26. In one form, the hot gases exiting turbine 24 are directed into an exhaust nozzle (not shown), which provides thrust output the gas turbine engine. In other embodiments, additional turbine stages in one or more additional rotors may be employed, e.g., in multi-spool gas turbine engines, which may include turbines upstream and/or downstream of turbine 24.

Figure 2:
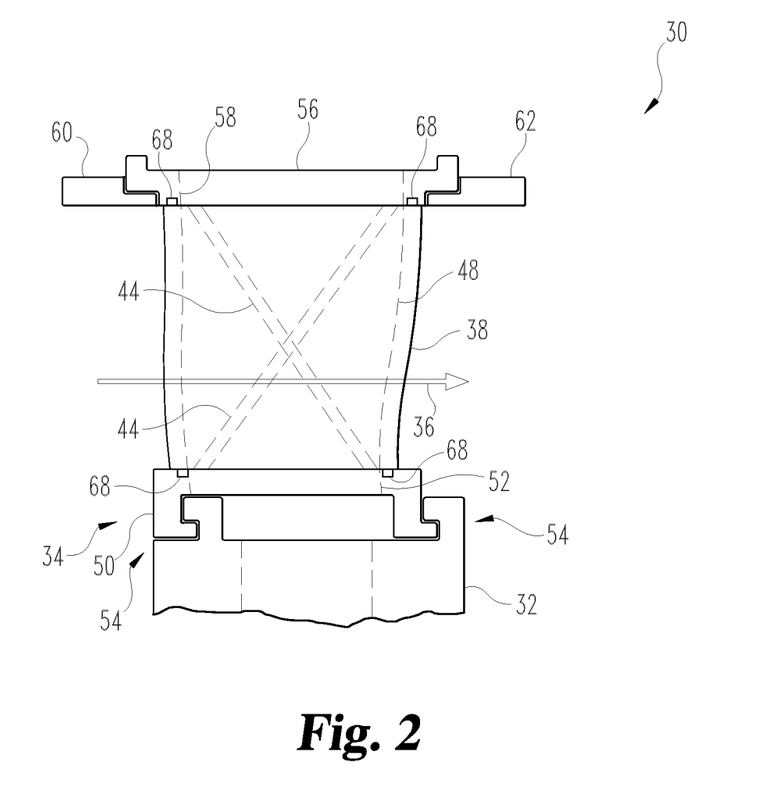
FIG. 2 depicts a non-limiting example of a vane assembly for a gas turbine engine in accordance with an embodiment of the present invention.
Figure 3:
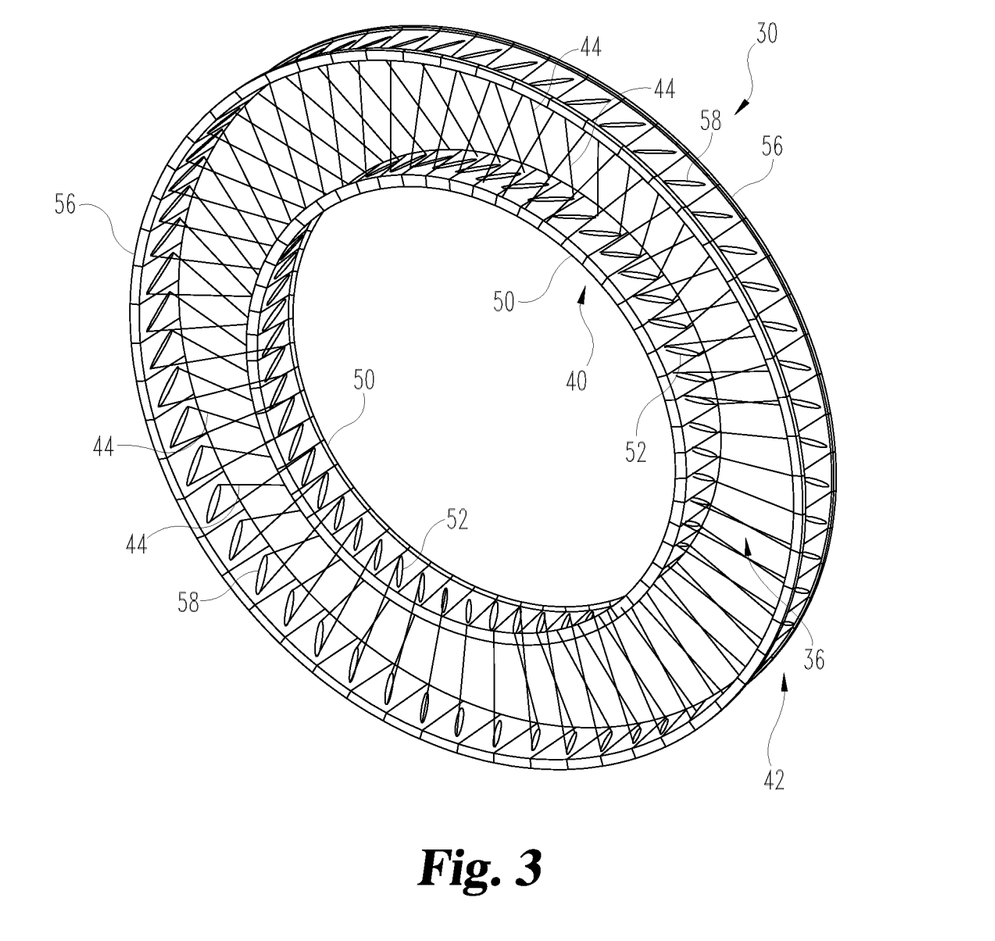
FIG. 3 depicts a non-limiting example of an inner ring, an outer ring and spokes coupling the inner and outer ring of the vane assembly of FIG. 2.
Figure 4:
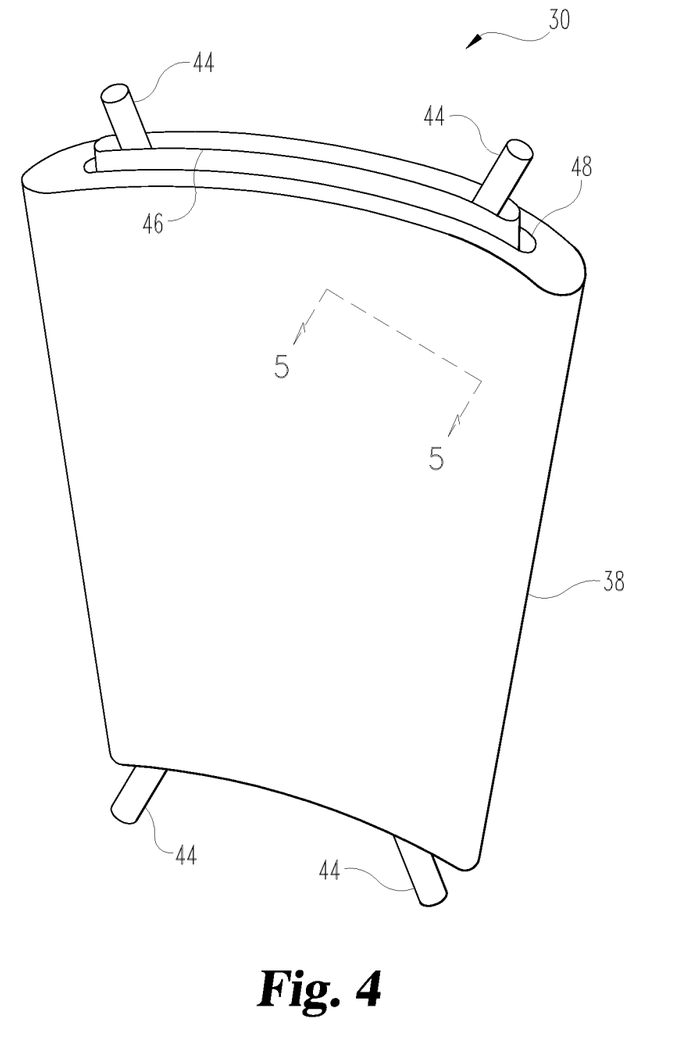
FIG. 4 depicts a non-limiting example of an airfoil with a cooling air tube and spokes disposed in the cooling air tube of the vane assembly of FIG. 2.

Referring now to FIGS. 2-4, turbine 24 includes a vane assembly 30 and a static engine component 32. In one form, vane assembly 30 is a second stage vane assembly. In other embodiments, vane assembly 30 may be a vane assembly of another turbine stage or of a compressor stage. In one form, second stage vane assembly 30 is formed of a plurality of vane packs 34, described below, which are arranged circumferentially to form an annular gas path 36.

Vane assembly 30 includes a plurality of circumferentially spaced composite airfoils 38, an inner ring 40, an outer ring 42, a plurality of spokes 44 and a plurality of cooling air tubes 46. Gas path 36 extends radially between inner ring 40 and outer ring 42. Gas path 36 directs hot gases exiting the first stage turbine blades of blades and vanes 28 through composite airfoils 38 into the second stage turbine blades of blades and vanes 28. In the depiction of FIG. 3, composite airfoils 38 are removed for purposes of illustration.

Composite airfoils 38 are turbine vane airfoils. Composite airfoils 38 are slidably disposed between inner ring 40 and outer ring 42. In one form, each composite airfoil 38 includes an opening 48. Opening 48 extends through composite airfoil 38 in the span-wise direction. In other embodiments, a greater or lesser number of openings 48 may be employed in vane assembly 30. In still other embodiments, no openings 48 may be employed. Composite airfoils 38 are formed of a composite material. In one form, the composite material is a ceramic matrix composite. Other composite materials may be employed in other embodiments, e.g., including metal matrix composites, organic matrix composites and/or carbon-carbon composites.

Inner ring 40 defines the inner wall of gas path 36. Inner ring 40 is formed of a circumferentially arranged plurality of arcuate inner shroud segments 50. In one form, each inner shroud segment 50 includes an opening 52 adjacent and corresponding to the opening 48 of each composite airfoil 38 in vane pack 34. In other embodiments, a greater or lesser number of openings 52 may be employed. In still other embodiments, no openings 52 may be employed.

Inner shroud segments 50 are metallic, e.g., nickel-base superalloys. An example of a material for inner shroud segments 50 is Inconel 718. In other embodiments, inner shroud segments 50 may be formed of a nonmetallic material, such as a composite material.

Inner ring 40 is coupled to static engine component 32 via piloting features 54. In one form, piloting features 54 may be pilot diameter arrangements. In one form, static engine component 32 is a preswirler that provides a circumferential velocity component to cooling air being supplied to second stage turbine blades (not shown) from vane assembly 30. In other embodiments, static engine component 32 may take other forms. In still other embodiments, static engine component 32 may house or support one or more rotating engine components. In some embodiments, static engine component 32 is coupled to and supported by inner ring 40. In some embodiments, static engine component 32 is supported and positioned by only vane assembly 30. In some embodiments, static engine component 32 provides hoop loading via piloting features 54 to retain inner shroud segments 50 in circumferential contact and/or close circumferential proximity to each other, to maintain the circularity of inner ring 40, and/or to provide a structural ground for spokes 44 (via inner shroud segments 50) to allow spokes 44 to be in a state of tension. In yet other embodiments, inner ring 40 may not be coupled to any static engine component. In some forms, inner shroud segments 50 may include interlocking features (not shown) or interface features (not shown) that interface with interlocking features (not shown) in order to provide inner ring 40 with a hoop load carrying capacity.

Outer ring 42 defines the outer wall of gas path 36. Outer ring 42 is formed of a circumferentially arranged plurality of arcuate outer shroud segments 56. In one form, each outer shroud segment 56 includes an opening 58 adjacent and corresponding to the opening 48 of each composite airfoil 38 in vane pack 34. In other embodiments, a greater or lesser number of openings 58 may be employed. In still other embodiments, no openings 58 may be employed.

Outer shroud segments 56 are metallic, e.g., nickel-base superalloys. An example of a material for outer shroud segments 56 is Inconel 718. In other embodiments, outer shroud segments 56 may be formed of a nonmetallic material, such as a composite material.

Outer ring 42 is coupled to a turbine structure 60 and a turbine structure 62, which may be, for example, turbine case structures, such as vane case structures, or first and second stage turbine blade tracks, respectively. In other embodiments, outer ring 42 may be coupled to only a single component or may be coupled to more than two components.

In one form, each vane pack 34 includes a single inner shroud segment 50, a single outer shroud segment 56 and two composite airfoils 38. In some embodiments, each vane pack 34 includes a single inner shroud segment 50, a single outer shroud segment 56 and two composite airfoils 38. In other embodiments, a greater or lesser number of airfoils 38 may be associated with each vane pack 34. A plurality of vane packs 34 are assembled together circumferentially to yield the annular vane assembly 30 illustrated in FIG. 3.

Spokes 44 are disposed within opening 48 each composite airfoil 38. Spokes 44 extend between inner ring 40 and outer ring 42, and are coupled to both inner ring 40 and outer ring 42. In particular, spokes 44 are coupled to each inner shroud segment 50 and outer shroud segment 56 of inner ring 40 and outer ring 42, respectively. Inner ring 40, outer ring 42 and spokes 44 form a hub-and-spoke arrangement. Spokes 44 are operative to transfer loads between inner ring 40 and outer ring 42, in conjunction with composite airfoils 38. In one form, spokes 44 are pre-tensioned at assembly, i.e., pre-stressed with a tensile load. In one particular example, spokes 44 are preloaded to 80% of room temperature yield strength at assembly. In one form, there are two (2) spokes for each composite airfoil 38. In other embodiments, a greater or lesser number of spokes 44 may be employed. In one form, spokes 44 are formed from wire. An example of a material for spokes 44 is Waspalloy, e.g., Waspalloy wire.

Cooling air tube 46 is disposed within opening 48. In one form, cooling air tube extends through composite airfoil 38. In another form, portions of cooling air tube 46 also extend into opening 52 of inner shroud segment 50 on one end, and extend into opening 58 of outer shroud segment 56 on the other end. Spokes 44 are disposed within and extend through cooling air tube 46. Cooling air tube 46 is operative to transfer cooling air through second stage vane assembly 30 to static engine component 32. In one form, cooling air tube 46 is metallic, e.g., a nickel-base superalloy. An example of a material for cooling air tube 46 is Inconel 718. In other embodiments, cooling air tube 46 may be formed of a nonmetallic material, such as a composite material. It will be understood that some embodiments may not employ a cooling air tube 46.

Figure 5:
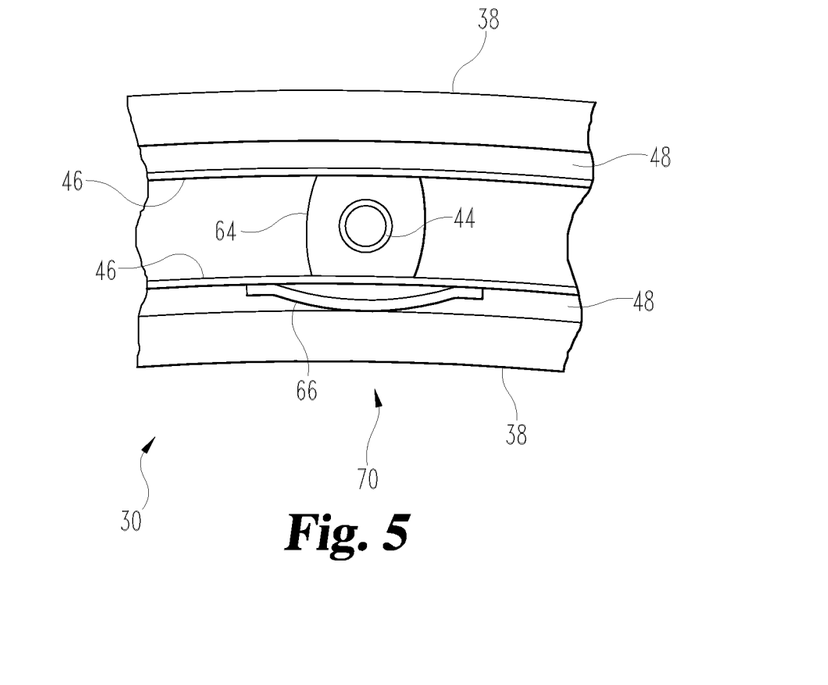
FIG. 5 is a cross-section through the airfoil depicted in FIG. 4 that illustrates a bushing and a pad that transfer loads between the airfoil and a spoke of the vane assembly of FIG. 2.

Referring now to FIG. 5, vane assembly 30 includes a plurality of bushings 64 disposed around spokes 44 and inside cooling air tube 46. Bushings 64 are operative to transfer loads from composite airfoil 38 to spokes 44. In one form, two (2) bushings 64 are employed at each spoke 44. In other embodiments, a greater or lesser number of bushings 64 may be employed. In still other embodiments, vane assembly 30 may not include any bushings 64.

Cooling air tube 46 includes pads 66 adjacent the inner surface in opening 48 of each composite airfoil 38. Pads 66 are operative to transfer loads between composite airfoil 38 and spokes 44 (in one form, via cooling air tube 46 and bushings 64). In one form, each cooling air tube 46 includes three (3) pads 66. In other embodiments, a greater or lesser number of pads 66 may be employed. In still other embodiments, cooling air tubes 46 may not include any pads 66. In yet other embodiments, opening 48 of each composite airfoil 38 may include raised pads to transfer loads from composite airfoil 38 to spokes 44. In some embodiments, pads 66 are compliant, e.g., in order to distribute loading on the interior surface of opening 48 of composite airfoils 38.

During the operation of gas turbine engine 10, cooling air is supplied to static engine component 32 via openings 58 of outer ring 42, cooling air tubes 46 disposed within openings 48 of composite airfoils 38, and openings 52 of inner ring 40.

In some forms, vane assembly 30 includes seals 68 (FIG. 2) to prevent leakage of cooling air from opening 48 and to prevent ingress of hot gases into openings 48, 52 and 58. In one form, seals 68 are located in inner shroud segments 50 and outer shroud segments 56. In other embodiments, seals 68 may be located in composite airfoils 38 or otherwise between surfaces of composite airfoils 38 and surfaces of inner shroud segments 50 and outer shroud segments 56. In other embodiments, seals 68 may not be employed. In some embodiments, vane assembly 30 includes seals (not shown) operative to provide sealing between each adjacent pair of inner shroud segments 50. In some embodiments, vane assembly 30 includes seals (not shown) operative to provide sealing between each adjacent pair of outer shroud segments 56.

In some embodiments, cooling air tube 46 reduces undesirable heating of the cooling air supplied through vane assembly 30 by preventing or reducing contact of the cooling air with hot surfaces in opening 48 of composite airfoil 38. In some embodiments, spokes 44 are kept relatively cool due to the passage of cooling air through cooling air tube 46, which in some embodiments bathes the spokes 44 in the flow of cooling air and enhances the load-carrying capacity of spokes 44 by preventing or reducing degradation of the spoke 44 material properties that may otherwise result from operation at elevated temperatures.

Aerodynamic loading of composite airfoils 38, e.g., in direction 70 (FIG. 5), causes composite airfoils 38 to slide against inner shroud segments 50 and outer shroud segments 56 until pads 66 nest against composite airfoils 38. Once nested, spokes 44 limit the movement of composite airfoils 38, and aerodynamic loads on composite airfoils 38 are transferred to spokes 44 via pads 66, cooling air tube 46 and bushings 64. These loads are transferred to turbine structure 60, 62 via outer ring 42.

Loads from static engine component 32 are transferred to inner ring 40, e.g., via piloting features 54 that couple static engine component 32 and inner ring 40. These loads are then transferred from inner ring 40 to outer ring 42 by composite airfoils 38 in conjunction with spokes 44, and are transferred to turbine structure 60, 62 via outer ring 42.

Embodiments of the present invention include vane segment for a gas turbine engine, comprising: an outer shroud; an inner shroud; a composite airfoil slidably disposed between the outer shroud and the inner shroud, the airfoil having a passage extending between the outer shroud and the inner shroud; and a spoke extending through the passage between the outer shroud and the inner shroud, wherein the spoke is operative to limit a movement of the airfoil.

In a refinement, the vane segment is structured to transfer aerodynamic loads from the airfoil to the spoke.

In another refinement, the spoke is pre-stressed at room temperature conditions with a tensile preload.

In yet another refinement, the spoke is a metal wire.

In still another refinement, the vane segment is structured to transfer loads from the inner shroud to the outer shroud via the spoke.

In yet still another refinement, the spoke is affixed to the inner shroud and to the outer shroud.

In a further refinement, the vane segment further comprises a tube disposed in the passage, wherein the spoke extends through the tube.

In yet a further refinement, the vane segment further comprises a compliant pad structured to transfer aerodynamic loads from the airfoil to the tube, and wherein the tube is structured to transfer the aerodynamic loads to the spoke.

In still a further refinement, the vane segment further comprises a second spoke extending through the passage and between the outer shroud and the inner shroud.

In yet still a further refinement, the vane segment further comprises a bushing disposed on the spoke and structured to transmit aerodynamic loads to the spoke.

Another embodiment includes a gas turbine engine, comprising: a compressor; a turbine; and a vane stage having an inner ring, an outer ring, a plurality of airfoils disposed between the inner ring and the outer ring, and a plurality of spokes extending between the inner ring and the outer ring through the plurality of airfoils, the spokes interconnecting the inner ring and the outer ring in a hub-and-spoke arrangement.

In a refinement, the gas turbine engine further comprises a vane case structure, wherein the outer ring is supported by the vane case structure.

In another refinement, the plurality of spokes are coupled to the inner ring and to the outer ring, and wherein the vane stage is structured to transfer loads from the inner ring to the vane case structure via the plurality of spokes and the outer ring.

In yet another refinement, the outer ring is formed of a plurality of vane segment outer shrouds.

In still another refinement, the inner ring is formed of a plurality of individual vane segment inner shrouds.

In yet still another refinement, the gas turbine engine further comprises an engine component supported by the inner ring, wherein the vane stage is structured to transfer loads from the engine component via the inner ring and the plurality of spokes to the outer ring.

In a further refinement, the engine component is a pre-swirler.

In a still further refinement, the plurality of airfoils are structured to float in a flowpath direction and transfer aerodynamic loads imposed on the plurality of airfoils to the plurality of spokes.

Embodiments also include gas turbine engine, comprising: at least one of a fan, a compressor and a turbine, wherein at least one of the fan, the compressor and the turbine includes a vane stage, the vane stage including: an inner ring; an outer ring; a plurality of airfoils slidably disposed between the inner ring and the outer ring; and means for transferring loads from the inner ring to the outer ring, wherein the means for transferring loads extends between the inner ring and the outer ring through the plurality of airfoils.

In a refinement, the means for transferring loads from the inner ring to the outer ring includes means for transferring aerodynamic loads from the plurality of airfoils to the outer ring.

In another refinement, the plurality of airfoils are composite airfoils.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A vane segment for a gas turbine engine, comprising:
   an outer shroud;
   an inner shroud;
   a composite airfoil having a span slidably disposed between said outer shroud and said inner shroud, the entirety of the span being configured to move in a flowpath direction, the airfoil being configured at its ends to slide against said outer shroud and inner shroud from a first position to a second position, said airfoil having a passage extending between said outer shroud and said inner shroud; and
   a spoke extending through said passage between said outer shroud and said inner shroud, wherein said airfoil is moveable in the flowpath direction from the first position to the second position, and in the second position the spoke is operative to limit the movement of said airfoil.

2. The vane segment of claim 1, wherein in the second position said airfoil is structured to transfer aerodynamic loads from said airfoil to the inner and outer shroud through said spoke.

3. The vane segment of claim 1, wherein said spoke is pre-stressed at room temperature conditions with a tensile preload.

4. The vane segment of claim 1, wherein said spoke is a metal wire.

5. The vane segment of claim 1, wherein said vane segment is structured to transfer loads from said inner shroud to said outer shroud via said spoke.

6. The vane segment of claim 1, wherein said spoke is affixed to said inner shroud and to said outer shroud.

7. The vane segment of claim 1, further comprising a tube disposed in said passage, wherein said spoke extends through said tube.

8. The vane segment of claim 7, further comprising a compliant pad structured to transfer aerodynamic loads from said airfoil to said tube, and wherein said tube is structured to transfer said aerodynamic loads to said spoke.

9. The vane segment of claim 1, further comprising a second spoke extending through said passage and between said outer shroud and said inner shroud.

10. The vane segment of claim 1, further comprising a bushing disposed on said spoke and structured to transmit aerodynamic loads to said spoke.

11. A gas turbine engine, comprising:
    a compressor;
    a turbine; and
    a vane stage having an inner ring, an outer ring, a plurality of airfoils having a span and slidably disposed between said inner ring and said outer ring, the entirety of the span being configured to move in a flowpath direction, the airfoils being configured at their ends to slide against said inner ring and outer ring from a first position to a second position, and a plurality of spokes extending between said inner ring and said outer ring through said plurality of airfoils, wherein said plurality of spokes interconnects said inner ring and said outer ring in a hub-and-spoke.

12. The gas turbine engine of claim 11, further comprising a vane case structure, wherein said outer ring is supported by said vane case structure.

13. The gas turbine engine of claim 12, wherein each of said spokes are coupled to said inner ring and to said outer ring, and wherein said vane stage is structured to transfer loads from said inner ring to said vane case structure via said spokes and said outer ring.

14. The gas turbine engine of claim 11, wherein said outer ring is formed of a plurality of vane segment outer shrouds.

15. The gas turbine engine of claim 11, wherein said inner ring is formed of a plurality of individual vane segment inner shrouds.

16. The gas turbine engine of claim 11, further comprising an engine component supported by said inner ring, wherein said vane stage is structured to transfer loads from said engine component via said inner ring and said spokes to said outer ring.

17. The gas turbine engine of claim 11, wherein said plurality of airfoils are movable in the flowpath direction relative to the spokes and in the second position are structured to transfer aerodynamic loads imposed on said plurality of airfoils to said spokes.

18. A gas turbine engine, comprising:
    at least one of a fan, a compressor and a turbine, wherein at least one of said fan, said compressor and said turbine includes a vane stage, said vane stage including:
    an inner ring;
    an outer ring;
    a plurality of airfoils having a span and slidably disposed between said inner ring and said outer ring, the entirety of the span being configured to move in a flowpath direction, the airfoils being configured at their ends to slide against said inner ring and outer ring from a first position to a second position; and
    a plurality of spokes for transferring loads from said inner ring to said outer ring,
    wherein each one of said spokes is located between said inner ring and said outer ring and extends through a passage in one of said plurality of airfoils;
    wherein said plurality of airfoils are moveable in the flowpath direction from the first position to the second position, and in the second position the plurality of spokes are operative to limit the movement of the airfoils.

19. The gas turbine engine of claim 18, wherein said plurality of spokes are operable in the second position for transferring loads from said inner ring to said outer ring and for transferring aerodynamic loads from said plurality of airfoils to said outer ring.

20. The gas turbine engine of claim 18, wherein said plurality of airfoils are composite airfoils.

* * * * *